J. F. O'CONNOR.
ROLLER SIDE BEARING.
APPLICATION FILED JUNE 14, 1917.
1,290,317.
Patented Jan. 7, 1919.
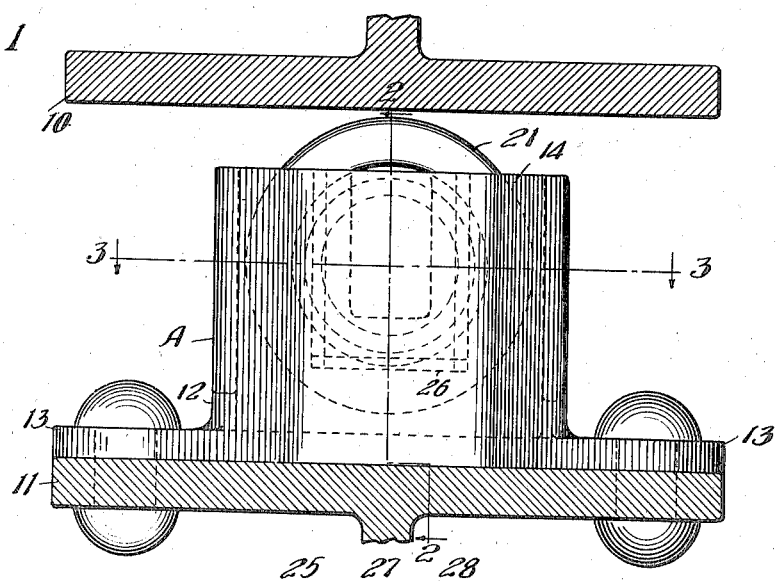
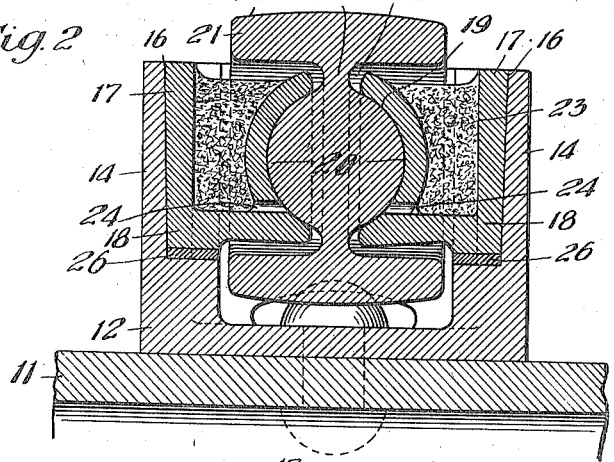
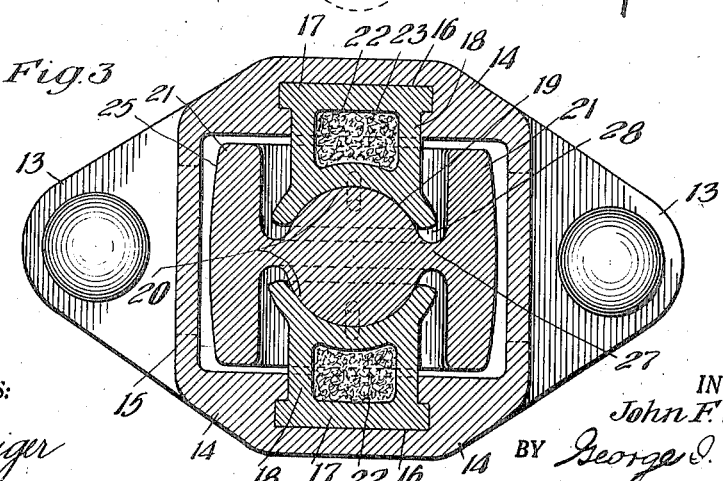
WITNESSES:
Wm. Geiger
INVENTOR.
John F. O'Connor
BY George D. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

ROLLER SIDE BEARING.

1,290,317.  Specification of Letters Patent.  Patented Jan. 7, 1919.

Application filed June 14, 1917. Serial No. 174,679.

*To all whom it may concern:*

Be it known that I, JOHN F. O'CONNOR, a citizen of the United States, residing at Chicago, in the county of Cook and State of Illinois, have invented a certain new and useful Improvement in Roller Side Bearings, of which the following is a full, clear, concise, and exact description, reference being had to the accompanying drawings forming a part of this specification.

This invention relates to improvements in roller side bearings.

The object of the invention is to provide a simple roller side bearing wherein the anti-friction roller is adjustable laterally and vertically to compensate for varying conditions in service.

In the drawing forming a part of this specification, Figure 1 is a part elevational view, part vertical sectional view of a roller side bearing shown in position between the body and truck bolsters of a car. Fig. 2 is a vertical sectional view, taken substantially on the line 2—2 of Fig. 1. And Fig. 3 is a horizontal sectional view taken substantially on the line 3—3 of Fig. 1.

In said drawing, 10 denotes the under surface of a body bolster of a car and 11 the upper portion of the truck bolster of a car. The improved roller side bearing, designated generally by the reference A, is shown as secured to the truck bolster.

The side bearing A, as shown, comprises a base casting 12 having lateral flanges 13 by which it is adapted to be riveted to the truck bolster, side walls 14—14 and end walls 15—15, the arrangement of said walls 14 and 15 being such as to provide a substantially rectangular recess in the upper portion of the base casting. The side walls 14—14 are provided on their inner faces with vertically extending under-cut grooves 16—16 which open into the space within the base casting. Said under-cut grooves 16 are adapted to receive correspondingly shaped flanges 17—17 formed on the outer ends of a pair of bearing members 18—18. Each of the bearing members 18 is provided at its inner end with a spherical bearing surface 19, said bearing surfaces 19 being in opposed relation and fitting over a spherical enlargement 20 formed centrally of the anti-friction roller 21. Each of the bearing members 18 is so formed as to provide a pocket 22 within which may be placed oil and waste 23, the oil being fed to the spherical bearing 20 of the roller through suitable openings 24.

The outer bearing surface of the roller 21 is preferably curved transversely, as indicated at 25, to thereby accommodate itself to variations in the angles between the opposed surfaces of the body and truck bolsters. In order to adjust the anti-friction roller vertically, shims 26—26 may be employed at the bottoms of the recesses 16 and beneath the bearing members 18. The under-cut grooves or recesses 16 are slightly inclined from the vertical, as shown in Fig. 2, to facilitate insertion of the bearing members within the base casting.

As clearly shown in Figs. 2 and 3, there is an appreciable clearance between the edges of the bearing surfaces 19 and the central web 27 of the roller, as indicated at 28, so that the anti-friction roller 21 is permitted not only a rotating movement about a horizontal axis but an oscillating movement, within predetermined limits, so that the roll is universally adjustable. With this arrangement, it is obvious that the anti-friction roller can readily accommodate itself to varying conditions of service and a true contact between the anti-friction roller and the opposed bolster maintained at all times.

I claim:

1. In an anti-friction bearing, the combination with a retaining casting, of an anti-friction roller, bearing members carried by said retaining casting, said roller having a spherical enlargement and said bearing members having correspondingly shaped bearing surfaces coöperable therewith to permit universal movement of said roller, and means for adjusting said bearing members vertically with respect to the retaining casting.

2. In a side bearing, the combination with a base casting, of an anti-friction roller having a central spherical enlargement, a pair of bearing members having coöperating bearing surfaces engaging said spherical enlargement, said bearing members and the walls of the retaining casting having tongue and groove connections.

3. In an anti-friction side bearing, the combination with a base casting having upstanding side walls provided with vertically extending recesses on the inner faces thereof, of an anti-friction roller, independent bearing members associated with said roller and disposed on the opposite sides thereof, said bearing members having their outer ends conformed to the shape of said recesses, the bearing members and roller being assembled with the base casting by sliding said bearing members vertically within said recesses.

In witness that I claim the foregoing I have hereunto subscribed my name this 26th day of May, 1917.

JOHN F. O'CONNOR.